3,651,080
Patented Mar. 21, 1972

3,651,080
CERTAIN SUBSTITUTED 2-ALKYLMERCAPTO-IMIDAZOLE DERIVATIVES

Karl J. Doebel, Ossining, N.Y., and Andre R. Gagneux, Basel, Switzerland, assignors to Ciba-Geigy Corporation
No Drawing. Continuation-in-part of application Ser. No. 721,930, Apr. 17, 1968, which is a continuation-in-part of application Ser. No. 500,245, Oct. 21, 1965. This application Nov. 7, 1969, Ser. No. 874,949
The portion of the term of the patent subsequent to Apr. 7, 1987, has been disclaimed
Int. Cl. C07d 49/36
U.S. Cl. 260—309     6 Claims

ABSTRACT OF THE DISCLOSURE

The compounds are of the class of substituted 2-alkylmercaptoimidazole derivatives which have anti-inflammatory utility. An illustrative example is 1-(4-methoxyphenyl)-2-methylmercapto-5-methylimidazole.

CROSS-REFERENCE TO RELATED CASES

This application is a continuation-in-part of application Ser. No. 721,930 filed Apr. 17, 1968, now U.S. Pat. No. 3,505,350, which is a continuation-in-part of application Ser. No. 500,245 filed Oct. 21, 1965, now abandoned.

DETAILED DISCLOSURE

This invention relates to certain derivatives of 2-alkylmercaptoimidazole which possess valuable pharmaceutical properties.

More specifically, the compounds of this invention pertain to compounds of the formula

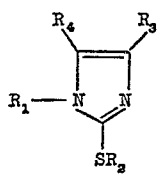

wherein
$R_1$ is lower alkyl, phenyl substituted by lower alkyl, lower alkoxy, halogen or trifluoromethyl;
$R_2$ is lower alkyl;
$R_3$ is hydrogen or lower alkyl;
$R_4$ is lower alkyl, phenyl or phenyl substituted by lower alkyl, lower alkoxy, halogen or trifluoromethyl,
provided that $R_1$ is lower alkyl only when $R_4$ is phenyl or substituted phenyl or a pharmaceutically acceptable acid addition salt thereof.

The term "lower alkyl" as used herein per se or as included in the term "lower alkoxy" means saturated monovalent aliphatic radicals of the formula $—C_mH_{2m+1}$ wherein $m$ designates an integer of less than 6 and is inclusive of both straight chain and branched chain radicals.

The term "halogen" denotes fluorine, bromine, chlorine and iodine.

The present invention comprehends not only the above-described derivatives of 2-mercaptoimidazole in its free base form, but it also includes pharmaceutically acceptable non-toxic acid addition salts thereof. Such salts are derived from inorganic and organic acids, such as hydrohalic acids, especially hydrochloric and hydrobromic acids, sulfuric, aminoacetic, lactic, succinic, malic aconitic, phthalic, tartaric acids, etc.

The compounds defined by the above formula can be synthesized, for example, by alkylating compounds wherein $R_2$ is hydrogen by means of an alkylating agent such as, for instance, alkyl halide. The preparation of compounds wherein $R_2$ is hydrogen is described more fully in copending application Ser. No. 721,930, filed Apr. 17, 1968, now U.S. Pat. No. 3,505,350.

The methods for the preparation of these compounds can be exemplified more fully by the following illustrative examples. The temperatures therein are given in degrees centigrade.

EXAMPLE 1

7-(4-methoxyphenyl)-2-methylmercapto-5-methylimidazole hydrochloride 1-(4-methoxyphenyl)-2-mercapto-5-methylimidazole (4.4 g., 0.02 mole) was suspended in water (20 ml.) and 3 N NaOH (6.6 ml.); the mixture was heated to 100° and dimethyl sulfate (0.04 mole, 5.66 ml.) was added. Sufficient dilute NaOH solution was added to maintain reaction mixture just basic to bromcresol purple indicator while heating at 100° for one-half hour. The reaction mixture was cooled, neutralized to pH 8–9 with saturated sodium carbonate solution and extracted with chloroform (5× 100 ml.). The chloroform extract was washed with water, dried over sodium sulfate and evaporated to dryness. The resulting oil (4.4 g.) was dissolved in isopropanol-isopropyl ether (1:1, 15 ml.) and ethanolic HCl (10 N, 2.5 ml.) was added. The desired product crystallized (1.4 g., M.P. 210–211°). The crude product from several reactions (4.0 g.) was recrystallized from isopropanol (30 ml.) to yield screening sample 3.5 g., M.P. 211-213° dec.).

Analysis.—Calc'd for $C_{12}H_{15}ClN_2OS$ (M.W. 270.79) (percent): C, 53.22; H, 5.58; N, 10.35; S, 11.84; Cl, 13.09. Found (percent): C, 53.00; H, 5.48; N, 10.39; S, 11.90; Cl, 13.36.

Ultraviolet spectrum:

$$\lambda_{max.}^{MeOH} \ 225 \ m\mu, \ 255 \ m\mu$$

EXAMPLE 2

1,5-dimethyl-2-(methylmercapto)imidazole hydrochloride

A solution of 1,5-dimethyl-2-mercaptoimidazole (10.2 g., 0.08 mole) and methyl iodide 22.7 g., 0.24 mole, 9.9 ml.) in anhydrous methanol (200 ml.) was heated under reflux for two hours. The solution was evaporated to dryness. The residue was suspended in water (80 ml.) and the pH was adjusted to 9–10 with saturated sodium carbonate solution. The aqueous mixture was extracted with chloroform (4× 200 ml.), the chloroform extract was washed with water, dried over sodium sulfate and evaporated to dryness to give oil (11 g.). To a solution of the oil in isopropanol was added 9 N ethanolic HCl (12 ml.) while cooling. The resulting solution was evaporated to dryness and the residue crystallized from isopropanol-isopropyl ether (3:1, 20 ml.) to give desired compound (12.3 g., M.P. 142–144°). Recrystallization from isopropanol-isopropyl ether (2:1, 30 ml.) yielded screening sample (11.3 g., M.P. 141–143°).

Analysis.—Calc'd for $C_6H_{11}ClN_2S$ (M.W. 178.70) (percent): C, 40.32; H, 6.20; N, 15.68; S, 17.94; Cl, 19.84. Found (percent): C, 40.14; H, 6.29; N, 15.42; S, 17.87; Cl, 19.86.

EXAMPLE 3

1-(4-fluorophenyl)-4-methyl-2-ethylmercaptoimidazole hydrochloride (a) α - Aminopropionaldehyde diethylacetal.—α-Aminopropionaldehyde diethylacetal was prepared from α-bromopropionacetal as described by R. Burtles et al., J. Chem. Soc. 1925, 581.

(b) Desired compound.—A mixture of α-aminopropionaldehyde diethylacetal (11.76 g., 0.08 mole), p-fluorophenyl isothiocyanate (12.24 g., 0.08 mole) in anhydrous benzene (80 ml.) was heated under reflux for one-half hour. The solution was evaporated to dryness; hydrochloric acid (6 N, 80 ml.) was added and the mixture was heated under reflux for 17 hours. Product corresponding to 1-(p-fluorophenyl)-4-methyl-2-mercaptoimidazole (0.7 g., M.P. 212–213°) crystallized on cooling. The mother liquor was extracted with chloroform (3×75 ml.); the chloroform extract was evaporated to dryness and the residue was crystallized from ethylacetate (50 ml.) to give title compound (16.2 g., M.P. 159–161° dec.). A portion of this hydrochloride salt (9.0 g.) was dissolved in water, the solution was rendered basic to pH 9 with saturated sodium carbonate solution and extracted with chloroform to give oil (7.4 g.). This redissolved in isopropanol (reagent grade, 10 ml.), ethanolic hydrochloric acid (9.9 N, 3.5 ml.) was added, and title compound (6.4 g., M.P. 160–162° dec.) crystallized. Recrystallization from isopropanol (10 ml.) gave screening sample (4.8 g., M.P. 159–161° dec.).

Thin layer chromatography: 95 $CHCl_3$, 5 3AEtOH.

Analysis.— Calc'd for $C_{12}H_{14}ClFN_2S$ (M.W. 272.78) (percent): C, 52.83; H, 5.17; N, 10.27; S, 11.76; Cl, 13.00. Found (percent): C, 53.06; H, 5.34; N, 10.28; S, 11.90; Cl, 13.01.

Ultraviolet spectrum:

$$\lambda_{max.}^{MeOH}\ 264\ m\mu\ (\epsilon,\ 6.500)$$

EXAMPLE 4

1-methyl-5-(p-chlorophenyl)-2-methylmercaptoimidazole hydrochloride

A solution of 1-methyl-5-p-chlorophenyl-2-mercaptoimidazole prepared as described in Example 1, 0.11 mole, 24.8 g.) and methyl iodide (0.33 mole, 46.86 g.) in anhydrous methanol (275 ml.) was heated under reflux for 2 hours, cooled and evaporated to dryness. The residue was suspended in 100 ml. of water and the suspension made basic to pH 9–10 with saturated sodium carbonate solution. The suspension was extracted with chloroform (400 ml.) and the chloroform solution was washed with water dried over sodium sulfate and evaporated to dryness. The product was dissolved in isopropanol, the solution was cooled and treated with 6.52 N ethanolic hydrochloric acid (22.9 ml.). The hydrochloric salt crystallized, was filtered off and washed with isopropanol. Yield: 26.19 g., M.P. 195–199° C. Recrystallization from isopropanol (200 ml., treatment with G–60 and KB charcoal) yielded purer product (22.49 g., M.P. 199–202° C.). One additional recrystallization from ethanol 2B (G–60 and KB Charcoal treatment, 100 ml.) yielded screening sample (13.9 g., M.P. 200–2° C.).

1-methyl-5-(p-chlorophenyl)-2-methylmercaptoimidazole

1 - methyl-5-(p-chlorophenyl) - 2 - methylmercaptoimidazole hydrochloride (2.0 g.) was dissolved in water, the solution was cooled and made basic to pH 9 with saturated sodium carbonate solution. The free base was filtered off and washed with water to give product (1.63 g., M.P. 89–90° C.). One recrystallization from cyclohexane gave analytical sample (1.04 g., M.P. 90–91° C.).

Analysis.—Calc'd for $C_{11}H_{11}ClN_2S$ (percent): C, 55.34; H, 4.65; N, 11.73; Cl, 14.86; S, 13.43. Found (percent): C, 55.47; H, 4.63; N, 11.66; Cl, 14.85; S, 13.44.

EXAMPLE 5

1,4-dimethyl-5-(p-chlorophenyl)-2-(methylmercapto) imidazole hydrochloride

A solution of 11.90 g. of 5-(p-chlorophenyl-1,4-dimethyl-2-mercaptoimidazole and 21.30 g. of methyliodide in 125 ml. of anhydrous methanol was heated under reflux for 2 hours, cooled and evaporated to dryness. The residue was suspended in water and made basic to pH 9–10 with a saturated sodium carbonate solution. The suspension was extracted with chloroform, dried over sodium sulfate and evaporated to dryness. The product was dissolved in isopropanol, cooled and treated with 8.72 ml. of 6.52 N ethanolic hydrochloric acid and evaporated to dryness. On recrystallization from 330 ml. of a mixture of isopropanol and hexane in a proportion of 1:3, 11.87 g. of the desired compound was obtained, M.P. 199–201° C.

Analysis.—Calc'd for $C_{12}H_{14}Cl_2N_2S$ (percent): C, 49.83; H, 4.88; N, 9.68; Cl, 24.52; S, 11.09. Found (percent): C, 49.71; H, 4.86; N, 9.68; Cl, 24.35; S, 10.90.

As indicated above, the compounds described hereinabove can be employed as anti-inflammatory agents to treat the four cardinal symptoms of inflammation: swelling, redness, pain and heat. The compounds of the present invention also exhibit analgesic and anti-pyretic properties besides the anti-inflammatory property. The anti-inflammatory and analgesic effects in warm-blooded animals were determined by carrageenin, UV erythema and hot box tests as follows:

(a) Anti-inflammatory: Carrageenin test

Male rats, five per group, weighing between 150–200 g., were given the test compounds orally one hour before carrageenin. 0.1 cc. of carrageenin was injected into the plantar area of the right hind paw. Three hours after administration of carrageenin and four hours after administration of test compounds or vehicle, the rats were sacrificed. Right and left hind paws were removed and weighed. The difference between these paws was determined for all animals within a group and the average difference calculated. The average difference of the vehicle control group was used as a point of comparison for test groups. If the average difference for a test group was smaller than that of the vehicle control, protection is present and is expressed in percentage of vehicle control. The following illustrative results were obtained.

TABLE I

| Test compound | Dose (mg./kg.), p.o. | Percent protection |
| --- | --- | --- |
| 5-(p-chlorophenyl)-1,4-dimethyl-2-methyl-mercaptoimidazole hydrochloride | 100 | 46 |
| 1-methyl-5-(p-chloropheynl)-2-methylmercaptoimidazole hydrochloride | 100<br>300 | 16<br>42 |

(b) Anti-inflammatory: Ultra violet erythema test

Guinea pigs, either sex, five per group, weighing between 275–375 grams, having their hair removed by using animal electrical clippers followed by chemical depilation with Nair. The next morning test compounds are given orally. Half of the total dose is given one hour before ultra violet irradiation. The other half is given immediately after UV exposure. Erythema is produced by 60 second exposure to ultra violet rays emitted by a Hanovia Analytical Model Quartz Lamp with a 500 watt high pressure mercury burner. In order to localize erythema to three 7 mm. areas, guinea pigs are confined in rubber gloves with three 7 mm. holes cut in them. Evaluation of results takes place 2 hours and 24 hours after ultra violet exposure. Erythema spots are scored from 0 to 3 giving a maximum total of 9 for an unprotected animal.

0=No visible signs of erythema
1=Faint trace of erythema
2=Definite but ill defined area of erythema
3=Definite and clearly defined area of erythema.

The scores of all animals within a given group are added together. A maximum score for any group of animals is 45 and is called the Maximum Degree of Inflammation. Any group with a degree of inflammation greater than vehicle control has 0% protection. Groups with values less than the control groups have protection and this is expressed in percent. Table II shows illustrative results.

TABLE II

Test compound:
    1-(4-Fluorophenyl)-4-methyl-2-ethylmercapto imidazole hydrochloride:
        Dose (mg./kg.) _____ 100
        Percent protection _____ 21

Analgesic activity: Hot box test

The mice are placed on copper plates at room temperature. The plates are heated by a hot plate. "Pain threshold" is reached when the hind limbs exhibit a sequence of rapid withdrawal reflexes. Male Charles River mice are weighing 18–30 g., four per group, are used. The mice are fasted for 4 hours; two control readings are taken 30 minutes apart. Following oral administration, readings are taken at 30, 60, 90 minutes or more depending on the activity and duration of the compounds. Table III gives illustrative results.

TABLE III

| Test compound | Dose (mg./kg.) | Percent protection |
| --- | --- | --- |
| 1-(4-methoxyphenyl)-5-methyl-2-methyl-mercaptoimidazole | 80 | 24 |
| 1-(4-fluorophenyl)-4-methyl-2-ethylmer-captoimidazole hydrochloride | 50 | 18 |

The amount of these compounds which is administered in use to effect an anti-inflammatory response must in all cases be adjusted to the mammal being treated, its age, weight and condition, as well as the degree of response required. Thus, while an anti-inflammatory response is observed in the range of about 0.1 mg./kg. to about 300 mg./kg., preferably about 1 mg./kg. to about 100 mg./kg., th actual dose should be carefully titrated to the particular subject in accordance with well-recognized principles of pharmacology.

What is claimed is:
1. A compound of the formula

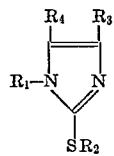

wherein
  $R_1$ is lower alkyl or phenyl substituted by lower alkoxy or halogen
  $R_2$ is lower alkyl
  $R_3$ is hydrogen or lower alkyl
  $R_4$ is lower alkyl or phenyl substituted by lower alkoxy or halogen
provided that $R_1$ is lower alkyl only when $R_4$ is substituted phenyl.

2. A pharmaceutically acceptable acid addition salt of a compound as defined in claim 1.

3. A compound as defined in claim 1 in which said compound is 1-(4-methoxyphenyl) - 2 - methylmercapto-5-methyl imidazole.

4. A compound as defined in claim 1 in which said compound is 1-(4-fluorophenyl)-4-methyl-2-ethylmercaptoimidazole.

5. A compound as defined in claim 1 in which said compound is 1-methyl-5-(p-chloro-phenyl)-2-methylmercaptoimidazole.

6. A compound as defined in claim 1 in which said compound is 1,4-dimethyl-5-(p-chlorophenyl)-2-methylmercaptoimidazole.

References Cited

UNITED STATES PATENTS

| | | | |
| --- | --- | --- | --- |
| 2,519,310 | 8/1950 | Dessert | 260—309 |
| 3,219,522 | 11/1965 | Gordon | 260—309 |
| 3,505,350 | 4/1970 | Doebel et al. | 260—309 |

OTHER REFERENCES

Burtles et al. Chem. Abst. vol. 19, pages 1709–10 (1925).

Kochergin et al. Chem. Abst. vol. 50, columns 8609–10 (1956).

Kovtunovskaya-Levshina Chem. Abst. vol. 58, column 7921 (1963).

Lawson et al. I J. Chem. Soc. (London) 1956, pages 1103–8.

Lawson et al. II Chem. Abst. vol. 50, column 2039 (1956).

NATALIE TROUSOF, Primary Examiner

U.S. Cl. X.R.

260—548 C; 424—273